Patented Jan. 9, 1940

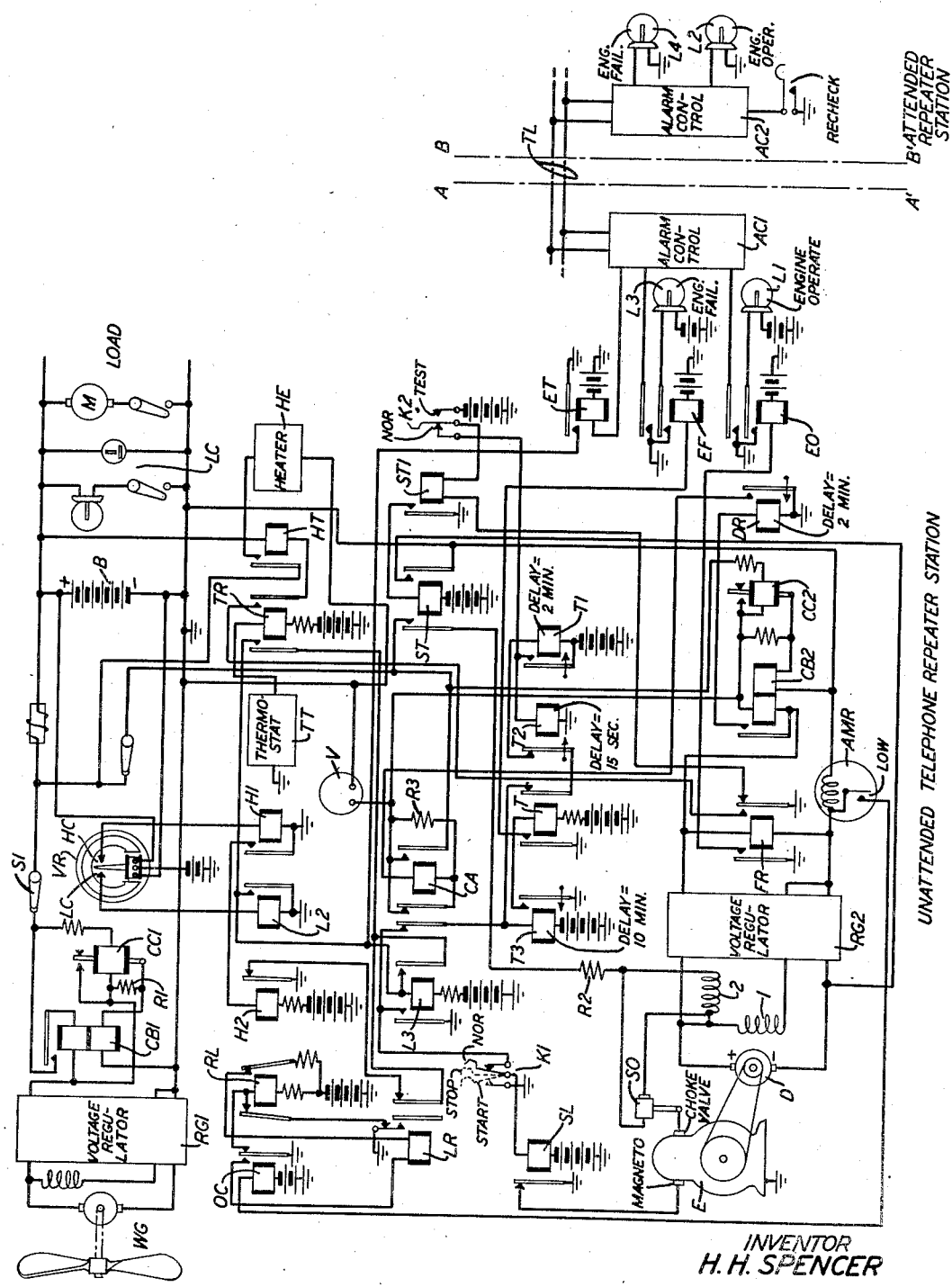

2,186,217

UNITED STATES PATENT OFFICE 2,186,217

CONTROL OF ELECTRIC GENERATING APPARATUS

Harry H. Spencer, Springfield, N. J., assignor to Bell Telephone Laboratories, Incorporated, New York, N. Y., a corporation of New York Application December 30, 1938, Serial No. 248,436

8 Claims. (Cl. 290—30)

The invention relates to electric generating systems and particularly to automatic or semi-automatic electric generating systems.

Long distance telephone communication systems, such as transcontinental carrier telephone systems, require repeater stations at more or less regular intervals throughout their length to provide the necessary amplification of the signal carrying currents. Some of these repeater stations may necessarily be located in remote, sparsely settled parts of the country, such as desert regions in the southwestern part of the United States or on the western plains, where there is no commercial source of power available. The main source of power for the current consuming apparatus, such as amplifiers, fans, heaters, etc., commonly used at such stations, are electrical storage batteries which are maintained continuously charged or are charged at regular intervals as the charge is depleted by the load, by some auxiliary local source of direct current power. In view of the prevalence of high velocity winds in such sections of the country, wind generators may be conveniently used for charging the batteries. In case of failure in the wind, or of the wind generator itself to generate the necessary charging power, it is desirable to have some other local charging source available as a standby, which may be brought into action quickly to replace or supplement the regular power source, for example, a direct current generator driven by a prime mover such as an internal combustion engine. For the purpose of saving fuel, etc., it is desirable, of course, that the auxiliary source be used only during the intervals of failure of the regular source.

Such standby apparatus can be readily started up and stopped manually if a regular attendant is available at the station to observe the charge condition of the battery. However, for economical reasons, it is often impracticable to have such an attendant always available at such a remote station, and in that case it is desirable to have some automatic means at the station for starting up the internal combustion engine to drive the auxiliary charging generator and to connect it to the battery, when the regular source fails entirely or in part, and to stop the engine and disconnect the auxiliary generator from the battery when the regular charging source resumes its normal operation. It is also desirable to have some automatic means which will operate alarms at the engine station and at a remote attended station to indicate whether or not the automatic control apparatus in functioning properly.

It is an object of the invention to maintain an uninterrupted power supply at a station at which a commercial power service and regular maintenance are not available.

Another object is to provide in an efficient manner automatic and manual control of an emergency power supply system.

In the power supply system of the invention, the main power source comprises an electrical storage battery supplying the load circuit, and a wind generator for charging the battery, which by a suitable relay circuit is automatically connected to the battery through a suitable voltage regulator when the generator output exceeds that of the battery by a given amount, and is automatically disconnected from the battery when its voltage is exceeded by that of the battery.

The auxiliary or standby power source for charging the battery when the wind generator fails comprises a dynamo capable of operating either as a motor or as a generator, a prime mover such as a gasoline engine mechanically coupled to the dynamo, and a relay circuit responsive automatically to a predetermined low voltage condition of the battery in the regular power supply to complete the ignition circuit for the engine; to cause the dynamo to operate first as a motor to intermittently crank the engine and, when the latter starts, as a generator driven by the engine; to cause the generator output to be connected across the battery to charge it after the engine has operated for a given warming-up period; to cause the generator output to be disconnected from the battery and the engine ignition circuit to be turned off to stop the engine when the charge of the battery exceeds a predetermined value; and to cause alarms to be given at the engine station or transmitted to a remote attended station to indicate engine operation or engine failure.

A feature of the invention is the design of this relay circuit to provide intermittent cranking of the engine for a limited time interval only, in order to prevent undue depletion of the station battery in energizing the relay circuit.

Other features include alternative manual and thermostatic means for starting and stopping the engine at the unattended repeater station, and remote control means for starting the engine from the attended repeater station.

The various objects and features of the invention will be better understood from the following detailed description thereof when read in connection with the single figure of the drawing showing schematically one embodiment of the invention.

In the embodiment of the invention illustrated in the drawing, an unattended repeater station of a long distance telephone communication system, such as a carrier telephone system, is connected to a remote attended repeater station by a telephone line TL. As they are not necessary for an understanding of the invention, the telephone apparatus and circuits which would be used at the two repeater stations are not shown in the drawing, the showing being limited to only as much of the power supply apparatus and associated control and alarm circuits considered to be necessary to explain the essential features of the invention.

In the drawing, all apparatus and circuits shown to the left of the dot-dash line AA' are located at the unattended repeater station of the telephone system and all apparatus and circuits shown to the right of the dot-dash line BB' are located at the attended repeater station.

At the unattended repeater station, the main source of power is the direct current storage battery B. A load circuit LC including various current consuming devices used at such a station, such as amplifying vacuum tubes, lamps, motors, fans, etc., is normally supplied with current from the battery B as indicated diagrammatically. A wind generator WG with an associated voltage regulator RG1, which may be any of the well-known types, through a relay circuit to be described later normally maintains the battery B in the charged condition.

The standby or emergency source of charging power at the unattended station includes a dynamo D of well-known type adapted to operate either as a motor or a generator, an internal combustion engine E mechanically coupled to the dynamo and a voltage regulator RG2, similar to the regulator RG1, associated with the generator output of the dynamo. A relay circuit, operating automatically in response to failure of the normal charging source to maintain the battery B charged, to start the engine and to connect the emergency charging source to the battery will be described in connection with the following description of operation of the whole system.

In the normal operation of the power supply system at the unattended repeater station, the wind generator WG and associated control apparatus, to be described, operate to automatically charge and regulate the voltage of the battery B depending on wind conditions, to compensate for the drop in battery voltage caused by the delivery of current by the latter to the load circuit LC.

In one system in accordance with the drawing which was built for use in connection with a commercial carrier telephone system, the station battery B when fully charged produced about 152 to 160 volts. The current output of the wind generator WG used varied with wind conditions but the current delivered to the battery thereby was limited to a maximum of 15 amperes by the associated regulator RG1. Winds of 14 to 18 miles per hour gave the rated output, but the relay circuit to be described was designated to operate to connect the generator and associated regulator to the battery when the generator output was such as would be caused by winds of 10 to 14 miles per hour applied to the wind generator. Where the prevailing winds gave a continuous average of about 12 miles per hour, the regulator RG1 was adjusted to give 152 volts as read on a discharge voltmeter.

The annual charging switch S1 is provided to enable the main charging equipment to be entirely disconnected from the battery B if desired. The winding of the polarized relay CC1 is connected to the output of the generator WG as indicated in such manner that when the voltage output of the generator is higher than the voltage of the battery B by a predetermined amount, say 2 volts, the relay CC1 will operate to complete an energizing circuit from battery B for the operating (upper) winding of the relay CB1 causing the operation of the latter relay to connect the output of the generator across the battery B. The CB1 relay, operated, causes the relay CC1 to release and insert resistance R1 in series with the winding of the CB1 relay to limit its holding current.

The generator WG and regulator RG1 are automatically disconnected from the battery B any time the regulated voltage falls below that of the battery, through the quick release of the reverse current relay CB1 due to its limited holding current. This would happen for the particular apparatus used when the wind velocity fell below 6 to 10 miles an hour, or on failure of the generator WG.

If there is a wind failure or a failure of the wind generator WG for an excessive period of time so that the load reduces the charge of the battery B to a predetermined low value, say 139 volts, where the maximum charge is 152 to 156 volts, the control circuit to be described will automatically operate to put the emergency or standby charging source in operation, or attempt to put it into operation, to charge battery B in the following manner.

When the charge on the battery reaches the predetermined low value (139 volts) the high-low voltage relay VR having its winding connected directly across the battery B operates its armature to the low charge contact LC completing an energizing circuit for the winding of relay L2, causing the operation of the latter relay to complete an energizing circuit for the winding of the relay L3 so that relay operates.

Relay L3, operated, locks up to ground through its right-hand contacts, the right-hand contacts of the LR relay and the contacts of the H2 relay. Relay L3, operated, through its left-hand contacts and the normal (NOR) contacts of the three-position key K1 places ground on the winding of the SL relay, operating that relay. The SL relay, operated, removes ground from the magneto of the gasoline engine E, so as to complete the ignition circuit for the engine.

Relay L3, operated, also through its left-hand contacts and the back (left-hand) contacts of the relay CA connects battery to the winding of the slow-operating (10 minutes) relay T3, and through the right-hand contacts of the relay T and the contacts of the relay T2 connects battery to the winding of the slow-operating (2 minutes) T1 relay. The T1 relay operates after a time delay of 2 minutes, but the T3 relay which has a 10-minute delay does not yet operate.

Relay T1, operated, connects battery to the winding of the relay T2, and through the normal (NOR) contacts of the test key K2 to the winding of the ST1 relay, operating the latter relay to ground through the right-hand contacts of the relay FR. Operation of the relay ST1 energizes the winding of the relay ST, and the latter relay operates its left-hand contacts to connect battery through current limiting resistance R2 to the series field 2 of the dynamo D causing operation of the dynamo as a motor to crank the engine E through a belt coupling between the dynamo and engine.

The winding of the ammeter relay AMR in the negative charging lead is shorted out through the right-hand contacts of the ST relay during its operation. The drop across the series field 2 of dynamo D during cranking operates solenoid SO to control the choke valve of the engine to provide automatic choking of the engine during the cranking period.

If the engine starts and speeds up, the voltage generated by the shunt field 1 of the dynamo D now operating as a generator driven by the engine, which is held adjusted by the regulator RG2 to the desired maximum voltage (160 volts at full load) will operate the voltage-operated relay FR which is connected directly across the regulator output in the generator output and operates on a selected lower voltage (120 volts). Relay FR operated, by opening its right-hand back contacts removes ground from the winding of the ST1 relay, causing the latter relay, and therefore the ST relay controlled by it, to release. Release of the ST relay opens the energizing circuit for the series field 2 of the dynamo to stop the cranking of the engine E.

Relay FR operated, through its left-hand contacts and the associated lead operates the "engine operate" relay EO to close through its front contacts an energizing circuit for lamp L1 which lights up to give an engine operation alarm at the unattended station, and through its back contacts, the alarm control AC1, which may be a selector switch, the conductors of the telephone TL and the alarm control AC2, similar to AC1, at the remote attended repeater station, controls the energization of the lamp L2, which indicates by its lighting up to the attendant at the attended repeater station that the engine E at the unattended station is operating properly.

As soon as the generated voltage of the dynamo D builds up to a predetermined value above (say 2 volts above) the voltage of battery B, the CC2 relay, corresponding to the relay CC1 in the main charging circuit, operates to connect battery directly to the shunt (right-hand) winding of the relay CB2, operating that relay to connect the generator output (output of regulator RG2) to the winding of the slow-operating (2 minutes) relay DR. After a delay of 2 minutes, provided to allow operation of the engine E for that period of time at no load to warm up, relay DR operates to connect ground to the winding of the CA relay operating the latter relay to connect through its right-hand contacts the generator output directly across the battery B, so that the battery is charged thereby. While in the operated position relay CA has a large (350 ohms) resistance R3 connected in series with its winding to limit its holding current. The relay CA operated opens its back left-hand contacts to remove ground from the windings of the T3 and T1 relays returning them to their normal unoperated condition.

The above procedure applies when the engine E starts readily. When the T1 relay operates to start cranking, it at the same time places battery on the winding of the T2 relay, which has a time delay of 15 seconds. If the relay T2 operates before the engine starts, it opens the energizing circuit for relay T1 which will release to deenergize relay ST1 and thus relay ST controlled thereby so as to stop cranking of the engine. The release of relay T1 also breaks the energizing circuit for relay T2 which, because of its design, will not release until 15 seconds have elapsed. When relay T2 releases, the energizing circuit for relay T1 will be made operative and the latter relay will operate again but not until 2 minutes later because of its delay time. The operation of relay T1 will cause the operation of relay ST1 and thus of relay ST to apply battery to the series field 2 of the dynamo D to start cranking of the engine again. If the engine does not start, this cycle of operations of relay T2 and T1 will be repeated with the engine being cranked for 15 seconds, rested for 2 minutes, cranked again for 15 seconds, and so on.

This process will be repeated until relay T3, to which battery had been applied when relay L3 first operated, operates at the end of its delay time of 10 minutes. The operation of relay T2 energizes the winding of relay T causing its operation to open its right-hand contacts to break the energizing circuits for relays T1 and T3 and thus prevent further cranking of the engine E.

Relay T operated closes through its left-hand contacts an energizing circuit for the "engine failure" relay EF which operates through its front contacts to close an energizing circuit for lamp L3 at the unattended stations which lights up to indicate engine failure, and through its back contacts, the alarm controls AC1 and AC2 and the conductors of the telephone line TL cause the lighting up of lamp L4 at the remote attended repeater station to indicate to the attendant at that station the failure of the engine E at the unattended station to operate.

It will be noted that after the engine E starts, for the period of 2 minutes or more required to complete operation of the DR relay, the relays T1 and T2 will be operating and releasing. This will have no effect on the cranking relays ST1 and ST, however since, as described above, the ground of the ST1 relay has been previously opened by operation of the relay FR.

With the engine started and the generator output of dynamo D connected to battery B through regulator RG2, the generator current limited to a maximum of, say 35 amperes, by the action of the regulator RG2 will continue to flow into battery B until the battery voltage reaches the value for which the regulator has been adjusted, for example, 159 volts, as read on the discharge voltmeter V. When the voltage reaches this value, the action of the regulator RG2 will be to reduce the generator output to prevent the battery voltage going higher. This action will continue with the current into the battery B decreasing until the ammeter relay AMR low contact is made. The setting of the low contact should be one which will not allow the engine E and dynamo D to operate for long periods at the regulated voltage since this will result in engine wear and excessive fuel cost. This setting will depend on the size of the battery and frequency at which the engine operates as a standby for the wind generator WG. In the particular installation used, the value was set approximately 10 amperes above the repeater load.

The making of the low contact of the ammeter relay AMR energizes the relay OC which operates to connect ground to the relay LR through the normally closed right-hand contacts of relay RL, operating relay LR to open its right-hand contacts to remove the lock-up ground from the winding of the relay L3 and to close the left-hand contacts of relay LR deenergizing relay RL. The consequent release of relay L3 removes the ground from the winding of the relay SL which then releases, placing ground on the magneto of the engine E to break the engine ignition circuit and stop the engine.

As the voltage generated by the dynamo D falls when the engine stops, reverse current from battery B through the operating winding of relay CB2 causes that relay to release which in turn releases relay DR and then relay CA. Release of the relay CA disconnects the generator output of dynamo D from the battery B and deenergizes the relay EO which causes the engine operate alarm lamps L1 and L2 at the unattended and attended repeater stations respectively to go out.

The ammeter relay AMR remaining on its low contact holds relay OC operated which releases the RL and LR relays and returns the circuit to normal.

Should the regulated voltage value of regulator RG2 be adjusted too high or the low contact cut-off of the ammeter relay AMR fail to operate for any reason, at a charge of 160 volts in battery B the relay VR will operate to its high voltage contact HC causing the operation of relay H1 to energize relay H2 which operates to open the lock-up ground from relay L3. The consequent release of relay L3 and thus of relay SL breaks the engine ignition circuit stopping the engine.

The engine may be started by remote control from the attended repeater station by holding the manual "recheck" button operated for approximately one-half minute to connect battery over the telephone line TL and alarm controls AC2 and AC1 to the ET relay at the unattended station, which is designed to have an operating time of less than one-half minute, operating that relay to place ground on the L3 relay to operate it. This means of starting is provided as a maintenance feature, it being desirable to run the motor at least once a week. As in the case of operation from the automatic relay VR operation or nonoperation of the engine will be indicated by the engine operate alarm and engine failure alarm lamps at the two stations. Once the engine is started it will run until the battery B is charged to the high regulated value when the engine will be stopped at described above.

The engine may be manually started at the unattended station by operating the manual key K1 to the (start) position which causes the energization and operation of relay SL to remove ground from the engine magneto, and by operating the test key K2 to (test) position to cause the energization and operation of relay ST1 and thus of relay ST to cause cranking of the engine. The engine will run until the key K1 is placed in the (stop) position which deenergizes relay SL and thus turns off the engine ignition. The keys K1 and K2 should then be returned to their (normal) positions. Manual operation should preferably be employed at infrequent intervals to provide overcharging of the battery B to return it to the full charged gravity condition.

A thermostat TT, which may be of any of the well-known types, may also be used for starting the engine automatically in response to a low temperature condition in the equipment room. The thermostat would be adjusted to operate at a predetermined low temperature, say 40° F., to close an energizing circuit for relay TR. Relay TR would operate through its left-hand contacts to cause operation of relay L3 to control the ignition circuit and the cranking circuit for the engine in the same manner as described previously. After the engine starts and drives the dynamo D as a generator, the relay FR operated in response to the generated voltage through its right-hand contacts connects ground through the closed right-hand contacts of the TR relay to the winding of the HT relay operating that relay. Relay HT operated connects a suitable heater HE to the battery B, the heater remaining operative to supply heat until the contacts of the thermostat TT open on a rise in room temperature above 40° F., or until the engine is cut off in the usual way.

Although for simplicity separate batteries have been shown in the drawing for supplying energizing current to the various relays of the control circuit for the engine E and dynamo D, preferably the energizing current for all of these relays would be obtained from the storage battery B in any suitable manner so that only one battery would be required at the station, in which case the low charge value of battery B at which the relay VR operates to its low voltage contact would be selected so that the battery will always furnish sufficient current for energizing the control relays.

Although the power supply system of the invention has been described above as applied to an unattended repeater station of a telephone system, its use it not so limited but it is of more general application.

It is to be understood that the various values specified for the elements, such as voltages and delay times of relays, in the system of the invention as described above and illustrated in the drawing, are to be taken by way of example only and not as limiting the invention.

Various modifications of the system described above and illustrated in the drawing which are within the spirit and scope of the invention will occur to persons skilled in the art.

What is claimed is:

1. A power supply system comprising a storage battery supplying a current consuming circuit, an auxiliary current source comprising a charging generator for charging said battery and an internal combustion engine having an ignition circuit, for driving said generator and means for controlling said auxiliary source comprising a plurality of relay means having predetermined operating delays, means automatically responsive to a given low voltage condition of said battery to complete the ignition circuit of said engine and to supply operating current to said relay means, certain of said relay means operating to cause cranking of the engine and interruption of the cranking for alternate small time intervals, other of said relay means operating to disable said certain relay means if the cranking is ineffective to start the engine within a limited period of time, and means responsive to the voltage generated by said generator when the engine starts and drives it within said limited period of time, to prevent further cranking of the engine.

2. In combination in a power supply system, a storage battery supplying current to a load circuit, means for charging said battery comprising a dynamo adapted to operate either as a motor or as a current generator, an internal combustion engine having an ignition circuit, mechanically coupled to said dynamo so as to be adapted to drive or be driven by said dynamo, a plurality of timing relays having predetermined delays in operation, control means responsive to a given low voltage condition of said battery to complete the ignition circuit of said engine and to cause operating current to be supplied, to said relays, certain of said relays operating to intermittently control said dynamo as a motor to crank said engine, and another of said relays operating to stop the cranking of said engine if it fails to start within a limited period of time, and means responsive to the dynamo output voltage when said engine starts and drives said engine as a generator, to disable said certain relays, and to connect said output of said dynamo to said battery to charge said battery.

3. In combination, an electrical storage battery, a charging generator, an internal combustion engine having an ignition circuit, for driving said generator, control means automatically responsive to a given low voltage condition of said battery to complete the ignition circuit of the engine and to intermittently crank said engine for a limited time interval, means responsive to the building up of a given output voltage by said generator driven by said engine when it starts, to prevent further cranking of said engine, means responsive to the building up of a higher output voltage for said generator larger than said given low voltage of the battery to connect the output of said generator to said battery to charge it, and means automatically responsive to a predetermined high voltage condition of said battery to stop said engine, disable said control means and disconnect said generator from said battery.

4. The combination of claim 2 in which said dynamo has series and shunt field windings and is adapted to operate as a motor to crank said engine when said series winding is energized and as a generator utilizing said shunt winding only, driven by said engine when it starts up, said certain relays include one relay operating to connect said battery to said series winding to energize it to start said cranking, a second relay energized by operation of said one relay and subsequently operating to deenergize said one ralay to interrupt the cranking until said second relay releases when said one relay again becomes operative, this cycle of operations being continuously repeated until said other relay operates at the end of said limited time period, said other relay when operative disabling the energizing circuit for said one relay.

5. A power supply system comprising an electrical storage battery supplying current to a load circuit, a main generator for charging said battery, an internal combustion engine having an ignition circuit, a dynamo mechanically coupled to said engine, said dynamo being adapted to operate either as a motor or as a generator, control means automatically responsive to failure of said main generator to maintain said battery charged above a given low voltage, to complete the ignition circuit of said engine, and to cause intermittent operation of said dynamo as a motor to crank said engine for a given time interval, voltage operated means responsive to the building up of a certain voltage by said dynamo operating as a generator driven by said engine when it starts and speeds up, to stop further cranking of said engine, means responsive to the building of a higher generated voltage larger than said given low voltage by said dynamo to connect said battery to the generator output of said dynamo so that the latter supplies charging current to said battery, means responsive to a predetermined high voltage condition of said battery to disable said control means, to stop said engine and to disconnect said battery from said dynamo, and means automatically responsive to failure of said engine to start within said given time interval to give an alarm.

6. In combination in a power supply system, a storage battery supplying current to a load circuit, means for charging said battery including a dynamo adapted to operate either as a motor or as a current generator, and an internal combustion engine having an ignition circuit, mechanically coupled to said dynamo so as to be adapted to drive or be driven by said dynamo, a plurality of timing relays having predetermined delays in operation, energized from said battery, control means operatively responsive to a given low voltage condition of said battery to complete the ignition circuit of said engine and to cause operating current to be supplied to said relays, certain of said relays operating to intermittently operate said dynamo as a motor to crank said engine, other of said relays operating to stop the cranking of said engine if it fails to start within a limited time interval, and means responsive to the dynamo output voltage when said engine starts and drives said dynamo as a generator to disable said certain relays, and to connect the dynamo output to said battery so as to deliver charging current thereto, and means responsive to a given high voltage condition of said battery to stop the engine and disconnect the dynamo from said battery.

7. The system of claim 6 in which said means responsive to a high voltage condition of said battery operates to disconnect said battery from said dynamo a predetermined time interval after said high voltage condition is reached so as to maintain a high voltage charge on the battery until all battery losses are returned.

8. The power supply system of claim 1, in which said certain relay means comprise one relay operating with a delay in the order of 2 minutes to start the cranking of said engine and a second relay operating in response to operation of said one relay with a delay in the order of 15 to 20 seconds, to disable said one relay to interrupt the cranking, and said other of said relay means comprises a third relay operating with a delay of approximately 10 minutes with respect to said one relay to disable said one relay.

HARRY H. SPENCER.